United States Patent [19]

Schrougham et al.

[11] 4,174,553
[45] Nov. 20, 1979

[54] COUPLING DEVICE FOR ANIMAL COLLARS

[76] Inventors: Benton Schrougham, 243 S. 25th St., Beech Grove, Ind. 46107; John W. Lee, 7791 W. 96th St., Zionsville, Ind. 46077

[21] Appl. No.: 942,459

[22] Filed: Sep. 15, 1978

[51] Int. Cl.² ............................................. A44B 11/00
[52] U.S. Cl. .................................... 24/74 R; 40/303; 119/106
[58] Field of Search ........................ 24/74, 73 H, 73 R; 119/106; 40/303, 21 C

[56] References Cited

U.S. PATENT DOCUMENTS

| 244,312 | 7/1881 | Riley | 119/106 |
|---|---|---|---|
| 272,036 | 2/1883 | Fassitt | 40/303 |
| 2,097,070 | 10/1937 | Lago | 119/106 X |
| 2,890,534 | 6/1959 | Quayle | 119/106 X |
| 3,585,743 | 6/1971 | Jeffers | 40/21 C |

*Primary Examiner*—Philip C. Kannan
*Attorney, Agent, or Firm*—Francis T. Kremblas, Jr.; Frank H. Foster

[57] ABSTRACT

A coupler for animal collars characterized by a novel combination of a releasable locking member biased in a normally closed position which is in the form of a curved resilient strip. This strip is adapted to receive a pair of post members provided on a channel-like base member which in turn receives respective ends of the collar which are held on the posts until the strip member is removed. The strip member may be removed by depressing the center portion which elongates the strip and permits its removal from the posts and their flanged top.

6 Claims, 4 Drawing Figures

COUPLING DEVICE FOR ANIMAL COLLARS

BACKGROUND

Prior art couplers or animal collar fastening devices have been available for strap-like materials or for chains, but not for both types.

Most couplers for strap collars in the past have required the strap material to be permanently fastened to a buckle by stitching or riveting. Such buckles are not suitable for use with chain collars.

The well-known Conway buckle can be used for overlapping and joining the ends of strap material without the necessity of stitching or riveting. However, the Conway buckle is not suitable for coupling the ends of a chain.

Chain collars in past have had their ends coupled by means of ordinary snaps or by S hooks inserted in holes at the opposite ends of a name plate. These link chain coupling means, however are not suitable for coupling strap materials.

The following patents were developed in a preliminary novel search.

U.S. Pat. Nos. 272,036, 115,647, 244,312, 3,585,743, 2,890,534, 1,262,447, 1,803,196, 2,097,070, 3,641,984, 146,770, 1,408,123, 2,065,946, 2,680,315, 1,539,744

It is noted that none of these patents disclose all of the elements of the invention herein or suggest in any unobvious manner the combination of those elements of the invention as disclosed herein.

However, as they are understood by the inventors and their attorney, it is their opinion that the more pertinent of these patents appear to be U.S. Pat. Nos. 244,312, 2,097,070 and 272,036.

U.S. Pat. No. 244,312 discloses a fastening device which includes a pair of curved plates which are adapted to be releasably joined together by aligning a pair of projections on one with mating openings on the other. Upon turning the projections they cannot pass through the registered openings and lock the plates together. The ends of the collar are fixed to respective ends of each plate.

U.S. Pat. No. 2,097,070 discloses a rather complex fastener providing a protective locking device. While a channel like body member is disclosed, it is employed in a quite different manner than that taught by Applicant and does not function or cooperate with the other elements in a similar manner as disclosed in the present invention.

U.S. Pat. No. 272,036 is representative of many others which disclose the concept of providing means in which to hold and display owner information on the collar. However, like the above-noted patents it is believed that there is no showing or suggestion of the unique combination as taught by applicants in the present invention.

None of these patents disclose a coupler which is easily connected to either strap or chain-like material in a simple and easy manner nor one where a resilient strip functions in a manner to releasably lock the collar ends on post members in the manner shown by applicant. Nor is there a teaching of such a strip which conveniently and economically also functions as a name plate for owner identification purposes or the like.

Since dogs are kept together, it is a well-known problem that the leather collars are readily accessible to be chewed by the other dogs. In view of the cost of typical buckle-type leather collars, replacement is expensive for those owners who choose not to use metal chain collars on their animals. The coupler of the present invention permits one to replace only the leather strap material when necessary since plain strap material is less expensive than a finished collar and is readily adaptable for use with the present invention. None of the cited patents herein disclose such a coupler which can be as easily adapted to both types of collar materials or which functions in the same manner as the present invention to function as a coupler for collars.

SUMMARY OF THE PRESENT INVENTION

The coupler for animal collars of the present invention comprises an elongated channel-like base member provided with upraised side walls and an upstanding post member disposed near but spaced from each end of the channel. Each post member is provided with a stop means preferably in the form of an outwardly facing shoulder near the top thereof. A flange-like extension, notch or some form of protrusion may be easily provided to form a suitable stop means. The ends of a collar of strap material provided with openings, or the links of a chain, may be adapted to easily slide over a respective post member.

A strip of resilient material having a normally convex curvature is uniquely employed as a releasable locking means as it is normally biased in a locked position on the posts which extend through spaced openings provided in the strip. Upon depressing the center portion of the strip, the ends thereof are forced outwardly permitting the openings to clear the stop means portion of the post to remove the strip and then the ends of the collar from the posts.

The upper surface of the resilient strip material may conveniently be provided with owner identification information to serve a dual purpose and increase the economy of the coupler device of the present invention.

OBJECTS OF THE PRESENT INVENTION

It is therefore an object of the present invention to provide a coupler for animal collars which may be used equally as well for strap material or chain collars.

It is another object of the present invention to provide a coupler of the type described which permits the user to conveniently and quickly replace worn or damaged collar portions or to switch from strap material to chain material as desired.

It is still another object of the present invention to provide a coupler of the type described which is opened and closed in a relatively easy and convenient manner and yet provides a secure coupling of the collar on the animal.

It is a further object of the present invention to provide a coupler of the type described which is of relatively low cost compared to other popular types and yet is more versatile and economical to the owners of more than one dog or the like.

IN THE DRAWINGS

DETAILED DESCRIPTION OF PRESENT INVENTION

Figure 1:
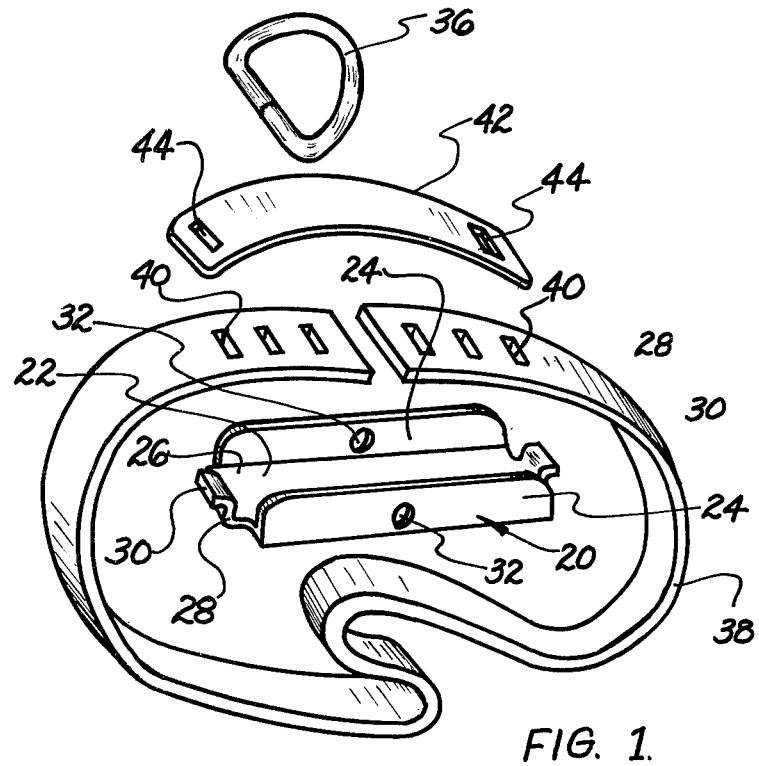
FIG. 1 is a perspective view of a coupler for animal collars constructed in accordance with the present invention with the various portions shown in exploded relationship.
Figure 2:
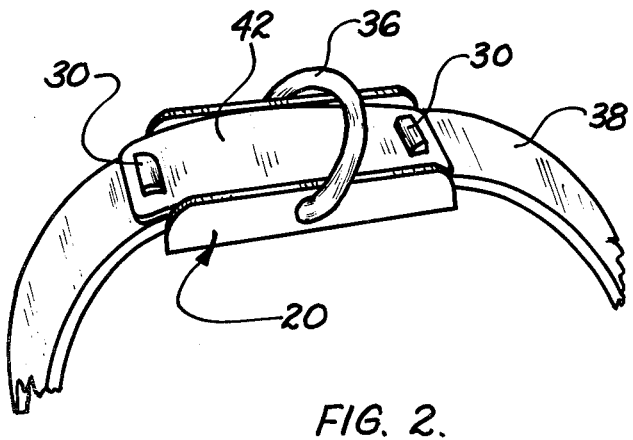
FIG. 2 is a perspective view of the coupler shown in FIG. 1 illustrating the coupler in its normal assembled configuration.

A coupler for animal collars constructed in accordance with the present invention is shown in FIGS. 1 and 2 and includes a base member indicated generally at 20, which comprises a generally rectangular plate 22 having upraised side portions 24 which define the width of a channel 26.

Near each end of plate 22 is a post member 28 which is provided with a stop means preferably in the form of an outwardly facing shoulder such as flange 30 to define the stop position.

Preferably base member 20 is an integrally formed piece of metal such as from a stamping operation, or one piece of molded plastic where a relatively light construction is deemed feasible.

An aligned pair of holes 32 are provided in side portions 24 to receive a conventional D-ring 36 or the like, for attachment to the snap of a lead or leash.

As seen in FIG. 1, a piece of strap material 38 typically leather or a synthetic substitute, may be provided with one or more openings or holes 40 near but spaced from its respective ends. The length of the collar may be cut according to the size of the animal upon which it is to be used. The additional holes are optional to provide for some degree of adjustment of its length after the initial length has been cut.

One of the respective holes 40 at each end are placed over a respective post member 28 such that the ends of collar 38 are attached to each end of base member 20.

A releasable locking member is provided in the form of a resilient strip 42.

Strip 42 is preferably made from a sheet of metal and provided with a slight degree of convex curvature along its length in its normal position and having sufficient resiliency or spring qualitites to return to this position upon depressing the center portion to reduce the degree of convex curvature.

A pair of openings 44 are provided, one near each end of strip 42, which are of a size to fit over the flanged post members 28.

The distance between each opening 44 is predetermined to be slightly shorter than the distance between the post members 28 when strip 42 is in its original curved configuration.

Therefore upon depressing the center portion of strip 42 to effectively reduce the degree of convex curvature, openings 44 are effectively moved apart a sufficient distance to permit a respective opening 44 to be slipped over a respective post member 44.

Release of the pressure on the center portion of strip 42 tends to return strip 42 to its original configuration with the spring force causing the openings 44 to engage the shoulder formed by flange 30 on each post member 28. The flange 30 on each post functions as a stop means to prevent further travel of strip 42 upwards on each post until the center portion is again depressed to lengthen the distance between the opening 44 to permit one of the openings 44 to be lifted clear of the shoulder formed by flange 30. A protrusion or notch or the like could be substituted for flange 30 to form an outwardly facing shoulder without departing from the spirit of the present invention.

Figure 3:
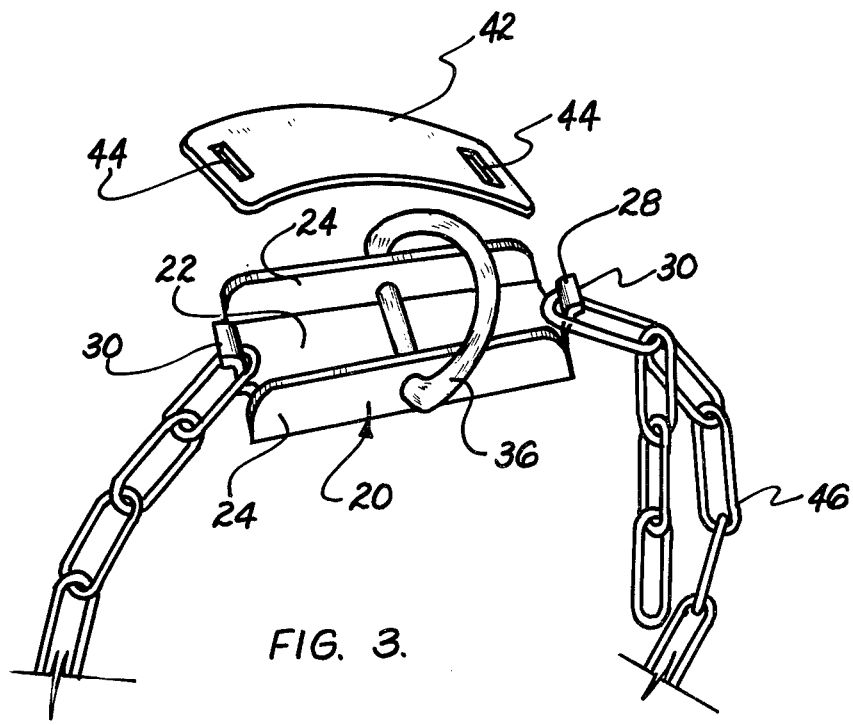
FIG. 3 is a view similar to FIG. 1 illustrating the coupler device with a chain type collar prior to replacement of the resilient strip being locked in position.
Figure 4:
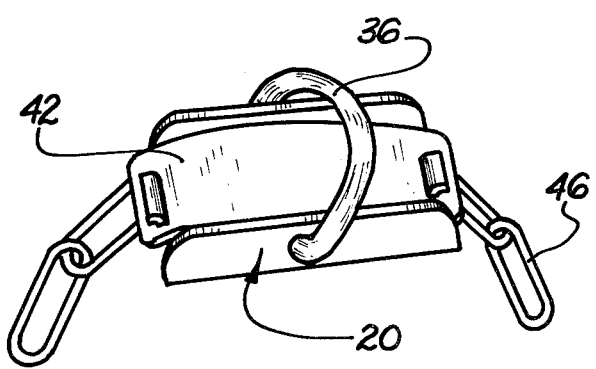
FIG. 4 is a perspective view of the device shown in FIG. 3 with the coupler and chain type collar completely assembled.

As shown in FIG. 3, the coupler of the present invention is equally useful with a chain type collar 46. The link portion of the chain may be simply disposed over a respective post member 28 prior to positioning the strip 42 over the post members as previously described.

It should be noted that owner identification indicia may be conveniently provided by engraving or the like on the upper face of strip 42 so that it may serve as a convenient name tag. This eliminates the need for an additional name plate or the like to be fastened to the collar portion 38 with rivots or the like which the most popular conventional collars require.

Also, it should be pointed out that other forms of collar material may be employed such as a plastic coated piece of metal cable with eyelets disposed at each end. The eyelets would then be positioned over the post members similarly to the links of the chain collar.

The base member 20, depending upon its size, may be made with a slight degree of curvature to generally conform to the contour of the animals neck, however, the post members 28 should always be substantially perpendicular to the radius of the base portion 22. This degree of curvature must not be so great to make depression of the strip 42 too difficult in order to remove the strip from the post members.

In using the coupler of the present invention, the user merely inserts the openings 40, or the links at or near the end of chain 46, on a respective post member 28.

Then one of the openings 44 is positioned over one of the post members 28 with the other opening near the opposite post. By placing one's fingers under the base member 20 and pressing the center portion of strip 42 downward with the thumb, strip 42 may be straightened a sufficient degree to permit the other opening 44 to slip over the respective post member 28.

Release of the pressure permits the inherent resiliency of strip 42 to clamp or engage each post member with the flanges 30 preventing unintentional release.

The coupler is unfastened by simply repeating the process of depressing the center portion while simultaneously lifting up one end of strip 42 to disengage it from post member 28.

In view of the foregoing description, it should be readily apparent that the present invention provides a novel, improved coupler for animal collars which is of relatively simple construction, is very easy to use, has greater versatility in the type of collar material which can be used than prior couplers of the general type and eliminates the need for rivots or stitching as used on prior collar types.

Further the coupler of the present invention provides a single unit which economically provides the coupling member, the D-ring and a nameplate in a compact construction which the user can employ interchangeably with strap or chain type collars.

What is claimed is:

1. In a coupler device for fastening an animal collar provided with an opening near each end of said collar, the combination of a base member having upstanding, longitudinally extending side portions defining the width of a channel and including a post member disposed near each end of said channel and upraised from the lower surface of said base member, each of said post members including a stop means and adapted to receive a respective one of said openings provided near the respective ends of said collar; a locking member comprising a strip of resilient material having a convex curvature along its longitudinal axis and including a pair of spaced openings; a respective one of said openings releasably engaging a respective one of said said stop means provided on said post members with said strip forming a closure over said channel and preventing displacement of the ends of said collars from a respective post member.

2. The device defined in claim 1 wherein said stop means includes an outwardly facing shoulder and wherein said openings in said strip freely slide downwardly on said post members and releasably engage said shoulder to restrain upward travel of said strip.

3. The device defined in claim 1 wherein said stop means comprises an outwardly extending flange portion disposed near the top portion of a respective post member.

4. In a coupler device for fastening an animal collar provided with an opening near each end of said collar, the combination of a base member having upstanding, longitudinally extending side portions defining the width of a channel and including a post member disposed near each end of said channel and upraised from the lower surface of said base member, each of said post members adapted to receive a respective one of said openings provided near the respective end of said collar and including an outwardly facing shoulder forming a stop means; a resilient strip-like member provided with a predetermined convex curvature along its longitudinal axis disposed in releasably locked relationship in said channel, said member including a pair of openings spaced from one another to freely receive a respective one of said post members including said stop means when said strip is depressed in a manner to reduce the degree of predetermined curvature and to engage said stop means of said post members in a locked relationship upon release of said pressure on said strip and its return to its original degree of curvature.

5. In a coupler device for fastening together the ends of an animal collar, the combination of a base means forming a channel-like member provided with upraised longitudinally extending side portions defining the width of said channel and an upraised post disposed near each end of said channel, each of said posts provided with an outwardly facing shoulder; a locking member comprising a strip of resilient sheet material having a predetermined convex curvature along its longitudinal axis and a pair of openings, each of said openings being disposed near but spaced from opposing ends of said strip, the distance between said openings and the degree of convex curvature being predetermined relative to the distance between said posts and the configuration of said shoulders on each of said posts whereby said strip is locked on said posts by engagement with said shoulders in its normal configuration and removable from said posts upon being temporarily straightened such that said openings may be lifted free from said shoulders on said posts.

6. The device defined in claim 5 wherein said outwardly facing shoulder are formed by an outwardly turned flange portion on each of said posts.

* * * * *